US008892258B2

(12) United States Patent
Jacobsen et al.

(10) Patent No.: US 8,892,258 B2
(45) Date of Patent: Nov. 18, 2014

(54) VARIABLE STRENGTH MAGNETIC END EFFECTOR FOR LIFT SYSTEMS

(75) Inventors: Stephen C. Jacobsen, Salt Lake City, UT (US); Fraser M. Smith, Salt Lake City, UT (US); Glenn Colvin, Jr., Park City, UT (US); John McCullough, Salt Lake City, UT (US)

(73) Assignee: Raytheon Company, Waltham, MA (US)

(*) Notice: Subject to any disclaimer, the term of this patent is extended or adjusted under 35 U.S.C. 154(b) by 201 days.

(21) Appl. No.: 13/332,160

(22) Filed: Dec. 20, 2011

(65) Prior Publication Data

US 2012/0277911 A1 Nov. 1, 2012

Related U.S. Application Data

(60) Provisional application No. 61/481,091, filed on Apr. 29, 2011, provisional application No. 61/481,110, filed on Apr. 29, 2011, provisional application No. 61/481,103, filed on Apr. 29, 2011, provisional application No. 61/481,089, filed on Apr. 29, 2011, provisional application No. 61/481,099, filed on Apr. 29, 2011, provisional application No. 61/481,095, filed on Apr. 29, 2011.

(51) Int. Cl.
| | |
|---|---|
| B25B 11/00 | (2006.01) |
| B66C 1/04 | (2006.01) |
| B25J 5/00 | (2006.01) |
| B66C 1/68 | (2006.01) |
| B25J 9/16 | (2006.01) |
| H01F 7/04 | (2006.01) |
| B25J 9/00 | (2006.01) |

(52) U.S. Cl.
CPC . *B25J 9/162* (2013.01); *B66C 1/04* (2013.01); *B25J 5/007* (2013.01); *B66C 1/68* (2013.01); *H01F 7/04* (2013.01); *B25J 9/0084* (2013.01)
USPC .............................................. 700/258; 483/27

(58) Field of Classification Search
USPC ........... 700/245–264; 324/260; 901/1, 30–38; 483/1–27; 318/563–567
See application file for complete search history.

(56) References Cited

U.S. PATENT DOCUMENTS

| | | | |
|---|---|---|---|
| 1,880,138 | A | 9/1932 | Franz |
| 3,280,991 | A | 10/1966 | Melton et al. |

(Continued)

FOREIGN PATENT DOCUMENTS

| | | |
|---|---|---|
| EP | 0616275 | 9/1998 |
| EP | 1258324 | 11/2002 |

(Continued)

OTHER PUBLICATIONS

PCT/US2012/035553; filed Apr. 27, 2012; Raytheon; International Search Report dated Oct. 31, 2012.

(Continued)

*Primary Examiner* — Dalena Tran
(74) *Attorney, Agent, or Firm* — Thorpe North & Western LLP

(57) ABSTRACT

A device and method for adjusting the magnetic strength of a magnetic end effector for lift systems is described. The magnetic end effector is capable of lifting discriminate payloads by selectively varying the strength of the magnetic forces output by the magnetic end effector. An actuator can be operatively coupled to the variable strength magnet end effector, wherein the actuator is selectively actuatable to control the adjustment of the variable strength magnet. The actuator may also be configured to maintain the variable strength magnet at a desired magnetic force output strength once achieved for any given amount of time.

11 Claims, 13 Drawing Sheets

(56) References Cited

U.S. PATENT DOCUMENTS

| | | | |
|---|---|---|---|
| 4,046,262 A | 9/1977 | Vykukal et al. | |
| 4,179,233 A | 12/1979 | Bromell et al. | |
| 4,251,791 A | 2/1981 | Yanagisawa et al. | |
| 4,483,407 A | 11/1984 | Iwamoto et al. | |
| 4,567,417 A | 1/1986 | Francois et al. | |
| 4,591,944 A | 5/1986 | Gravel | |
| 4,661,032 A | 4/1987 | Arai | |
| 4,666,357 A | 5/1987 | Babbi | |
| 4,762,455 A | 8/1988 | Coughlan et al. | |
| 4,768,143 A | 8/1988 | Lane et al. | |
| 4,853,874 A | 8/1989 | Iwamoto et al. | |
| 4,883,400 A | 11/1989 | Kuban et al. | |
| 4,921,292 A * | 5/1990 | Harwell et al. | 294/65.5 |
| 4,997,095 A | 3/1991 | Jones et al. | |
| 5,038,089 A | 8/1991 | Szakaly | |
| 5,072,361 A | 12/1991 | Davis et al. | |
| 5,101,472 A | 3/1992 | Repperger | |
| 5,105,367 A | 4/1992 | Tsuchihashi et al. | |
| 5,239,246 A | 8/1993 | Kim | |
| 5,282,460 A | 2/1994 | Boldt | |
| 5,336,982 A | 8/1994 | Backes | |
| 5,399,951 A | 3/1995 | Lavallee et al. | |
| 5,845,540 A | 12/1998 | Rosheim | |
| 5,949,686 A | 9/1999 | Yoshinada et al. | |
| 5,967,580 A | 10/1999 | Rosheim | |
| 5,994,864 A | 11/1999 | Inoue et al. | |
| 6,016,385 A | 1/2000 | Yee et al. | |
| 6,170,162 B1 | 1/2001 | Jacobsen et al. | |
| 6,272,924 B1 | 8/2001 | Jansen | |
| 6,301,526 B1 | 10/2001 | Kim et al. | |
| 6,394,731 B1 | 5/2002 | Konosu et al. | |
| 6,430,473 B1 | 8/2002 | Lee et al. | |
| 6,507,163 B1 | 1/2003 | Allen | |
| 6,659,703 B1 | 12/2003 | Kirkley | |
| 6,663,154 B2 | 12/2003 | Pancheri | |
| 7,396,057 B2 | 7/2008 | Ye et al. | |
| 7,405,531 B2 | 7/2008 | Khatib et al. | |
| 7,409,882 B2 | 8/2008 | Massimo et al. | |
| 7,410,338 B2 | 8/2008 | Schiele et al. | |
| 7,783,384 B2 | 8/2010 | Kraft | |
| 7,862,524 B2 | 1/2011 | Carignan et al. | |
| 8,024,071 B2 | 9/2011 | Komatsu et al. | |
| 8,151,401 B2 * | 4/2012 | Cheyne | 15/220.2 |
| 8,452,447 B2 | 5/2013 | Nixon | |
| 8,473,101 B2 | 6/2013 | Summer | |
| 8,529,582 B2 | 9/2013 | Devengenzo et al. | |
| 8,560,118 B2 | 10/2013 | Greer et al. | |
| 2003/0152452 A1 | 8/2003 | Hodgson | |
| 2005/0193451 A1 | 9/2005 | Quistgaard et al. | |
| 2006/0149419 A1 | 7/2006 | Ogawa et al. | |
| 2006/0184275 A1 | 8/2006 | Hosokawa et al. | |
| 2006/0245897 A1 | 11/2006 | Hariki et al. | |
| 2007/0105070 A1 | 5/2007 | Trawick | |
| 2007/0123997 A1 | 5/2007 | Herr et al. | |
| 2008/0281468 A1 | 11/2008 | Jacobsen et al. | |
| 2009/0038258 A1 | 2/2009 | Pivac et al. | |
| 2009/0039579 A1 | 2/2009 | Clifford et al. | |
| 2009/0210093 A1 | 8/2009 | Jacobsen | |
| 2010/0089855 A1 | 4/2010 | Kjolseth | |
| 2010/0198402 A1 | 8/2010 | Greer et al. | |
| 2011/0046781 A1 | 2/2011 | Summer | |
| 2011/0071677 A1 | 3/2011 | Stilman | |
| 2012/0237319 A1 | 9/2012 | Jacobsen et al. | |

FOREIGN PATENT DOCUMENTS

| | | |
|---|---|---|
| JP | 52013252 | 2/1977 |
| JP | H01-295772 | 11/1989 |
| JP | H02-51083 | 4/1990 |
| JP | H03-85398 | 8/1991 |
| JP | H04 44296 | 4/1992 |
| JP | 5004177 | 1/1993 |
| JP | H07-1366 | 1/1995 |
| JP | 7060679 | 3/1995 |
| JP | H07-112377 | 5/1995 |
| JP | HO7-31291 | 6/1995 |
| JP | H07-246578 | 9/1995 |
| JP | 9011176 | 1/1997 |
| JP | 11130279 | 5/1999 |
| JP | 2005/334999 | 12/2005 |
| WO | WO 2007/144629 | 12/2007 |
| WO | WO 2009/143377 | 11/2009 |

OTHER PUBLICATIONS

PCT/US2012/035570; filed Apr. 27, 2012; Raytheon Company; International Search Report dated Feb. 8, 2013.

PCT/US2012/038811; filed Apr. 27, 2012; Raytheon Company; International Search Report dated Feb. 13, 2013.

U.S. Appl. No. 13/332,129, filed Dec. 20, 2011; Stephen C. Jacobsen; office action issued Dec. 23, 2013.

Bauman; Utah Firm Markets on Big Gorilla of an Arm; Deseret News; Jan. 27, 1993; 2 pages.

Jacobsen; Science, Robotics, and Superheroes; Presented at University of Utah's Science at Breakfast, Mar. 17, 2010; 16 pages.

Heavy-Duty Magnetic Base, 300 lb (1334 N) Holding Force, ¼-20Thread; Newport; http://search/newport.com/?q=*&x2=sku&q2=200; as accessed Apr. 23, 2011; 1 page.

Jacobsen et al; Research Robots for Applications in Artificial Intelligence, Teleoperation and Entertainment; The International Journal of Robotics Research; Apr.-May 2004; pp. 319-330; vol. 23, No. 4-5.

Kim et al; A Force Reflected Exoskeleton-Type Masterarm for Human-Robot Interaction; IEEE Transactions on Systems, Man and Cybertentics-Part a: Systems and Humans; Mar. 2005; pp. 198-212; vol. 35, No. 2.

Manipulator Dynamics; Amikabir University of Technology; Computer Engineering and Information Technology Department; Power Point; 44 pages.

Schuler et al; Dextrous Robot Arm; In Proceedings of the $8^{th}$ ESA Workshop on Advanced Space Technologies for Robotic and Automation; 'ASTRA 2004'' ESTEC, Noordwijk, The Netherlands, Nov. 2-4, 2004; 8 pages.

Song et al; Kinematics Analysis and Implementation of a Motion-Following Task for a Humanoid Slave Robot Controlled by an Exoskeleton Master Robot; International Journal of Control, Automation and Systems; Dec. 2007; pp. 681-690; vol. 5, No. 6.

Tmsuk, Rescue Robot "T-□□53" release Control Technologies to Control the Synchronous Operation of the Arm; http://robot.watch.impress.co.jp/cda/news/2007/07/18/564.html; as accessed Sep. 1, 2011; 5 pages.

U.S. Appl. No. 13/332,129, filed Dec. 20, 2011; Stephen C. Jacobsen.
U.S. Appl. No. 13/332,138, filed Dec. 20, 2011; Stephen C. Jacobsen.
U.S. Appl. No. 13/332,146, filed Dec. 20, 2011; Stephen C. Jacobsen.
U.S. Appl. No. 13/332,152, filed Dec. 20, 2011; Stephen C. Jacobsen.
U.S. Appl. No. 13/421,612, filed Mar. 15, 2012; Stephen C. Jacobsen.
U.S. Appl. No. 13/332,165, filed Dec. 20, 2011; Stephen C. Jacobsen.

Yeates; Utah-Built Robot Safeguards the Workplace; http://www.ksl.corn?nid=148&sid=17654421&autostart=y; Oct. 13, 2011; 3 pages.

Giant Robot Grabbing Hands Grab All They Can; Jul. 17, 2007; 3 pages ; www.digitalworldtokyo.com/index.php/digital_tokyo/articles/giant_robot_grabbing_hands_grab_all_they_can/.

Industrial Magnetics, Inc.—PowerLift® Magnets; www.magnetics.com/product.asp?ProductID=1 ; 2 pages; as accessed Nov. 6, 2012.

Magnetic Base; www.ask.com/wiki/magnetic_base; 2 pages; page last updated Sep. 12, 2012.

Barras; "Stabilization of a Biped Robot with its arms—A Practical Approach"; May 1, 2010; http://biorob.epfl.ch/files/content/sites/biorob/filed/users/170220/public/Report.pdf; retrieved on Jul. 10, 2013.

Moosavian, et al.; "Dynamics Modeling and Tip-Over Stability of Suspended Wheeled Mobile Robots with Multiple Arms"; Oct. 29, 2007; IEEE; pp. 1210-1215.

PCT/US2012/035609; filed Apr. 27, 2012; Raytheon Company; search report dated Jul. 29, 2013.

PCT/US2012/035620; filed Apr. 27, 2012; Raytheon Company; search report dated Jul. 7, 2013.

PCT/US2012/035592; filed Apr. 27, 2012; Raytheon Company; search report dated Aug. 2, 2013.

(56) References Cited

OTHER PUBLICATIONS

PCT/US2012/035511; filed Apr. 27, 2012; Raytheon Company; International Search Report mailed Mar. 4, 2013.
U.S. Appl. No. 13/332,138, filed Dec. 20, 2011; Stephen C. Jacobsen; office action dated Mar. 10, 2014.
U.S. Appl. No. 13/332,152, filed Dec. 20, 2011; Stephen C. Jacobsen; office action dated Mar. 28, 2014.
U.S. Appl. No. 13/332,129, filed Dec. 20, 2011; Stephen C. Jacobsen; office action dated Jun. 17, 2014.
U.S. Appl. No. 13/332,146, filed Dec. 20, 2011; Stephen C. Jacobsen; office action dated Jul. 24, 2014.
U.S. Appl. No. 13/332,152, filed Dec. 20, 2011; Stephen C. Jacobsen; notice of allowance mailed Aug. 20, 2014.
Aliens (Movie), Starring Sigourney Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 00:27:40-00:28-05 & 02:08:25-02:10:39 Non-Patent Literature documentation; Aliens (1986)—IMDb; downloaded Sep. 27, 2014; 4 pages; http://www.imdb.com/title/tt10090605/.
U.S. Appl. No. 13/421,612; filed Mar. 15, 2012; Stephen C. Jacobsen; office action dated Oct. 7, 2014.

* cited by examiner

VARIABLE STRENGTH MAGNETIC END EFFECTOR FOR LIFT SYSTEMS

PRIORITY DATA

This application claims the benefit of U.S. Provisional Application Ser. No. 61/481,091, filed Apr. 29, 2011, which is incorporated by reference herein in its entirety. This application also claims the benefit of U.S. Provisional Application Ser. No. 61/481,110, filed Apr. 29, 2011; 61/481,103, filed Apr. 29, 2011; 61/481,089, filed Apr. 29, 2011; 61/481,099, filed Apr. 29, 2011; and 61/481,095, filed Apr. 29, 2011, each of which are incorporated by reference herein in their entirety.

BACKGROUND

Lifting and transporting specific types of objects and items from one location to another often presents considerable problems in terms of not being safe, efficient and/or cost effective. Moreover, conventional lifting and transporting systems using one or more end effectors are typically configured to perform a specific function with little variability regarding the capabilities of the end effector.

It is not uncommon for operator controlled lift and/or transport assistance systems, such as forklifts, cranes, hoists, jacks, platform lifts, etc. to utilize a magnetically powered end effector to lift and transport objects. However, many of these end effectors, when active, are deficient in terms of their functionality where a payload of a specific weight or a specific amount of payload is required or desired to be transported from one location to another. Indeed, the magnetic end effectors present in most lift and/or transport systems typically involve high power industrial grade magnets that indiscriminately lift and transport their payloads.

BRIEF DESCRIPTION OF THE DRAWINGS

The present invention will become more fully apparent from the following description and appended claims, taken in conjunction with the accompanying drawings. Understanding that these drawings merely depict examples of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION

Figure 1:
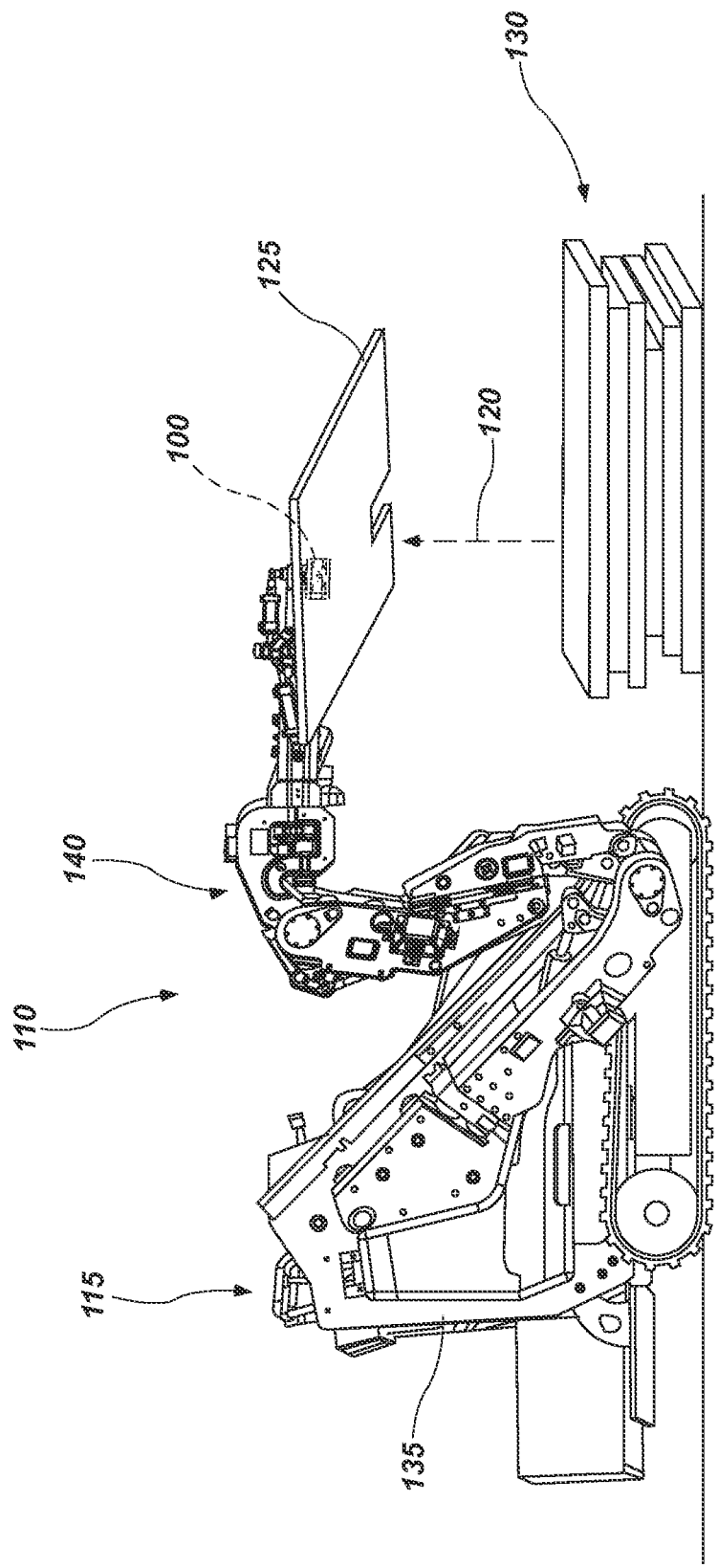
FIG. 1 illustrates a perspective view of a teleoperated robotic lift system having a magnetic end effector configured in accordance with one example of the present disclosure.

The present invention is related to copending nonprovisional U.S. patent application Ser. No. 13/332,165, filed Dec. 20, 2011, and entitled, "Teleoperated Robotic System"; Ser. No. 13/332,152, filed Dec. 20, 2011, and entitled, "System and Method for Controlling a Tele-Operated Robotic Agile Lift System"; Ser. No. 13/332,138, filed Dec. 20, 2011, and entitled, "Platform Perturbation Compensation"; Ser. No. 13/332,146, filed Dec. 20, 2011, and entitled, "Robotic Agile Lift System with Extremity Control"; Ser. No. 13/332,129, filed Dec. 20, 2011, and entitled, "Multi-degree of Freedom Torso Support for Teleoperated Robotic Agile", each of which is incorporated by reference in its entirety herein.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. In other words, something that is "substantially free of" an item may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference will now be made to certain examples, and specific language will be used herein to describe the same. Examples discussed herein set forth an adjustable or variable strength magnetic end effector for lift systems. In particular examples, the magnetic end effector is operational with a teleoperated robotic lift system, wherein the magnetic end effector is capable of lifting discriminate payloads by selectively actuating an actuator, such as a linear hydraulic actuator or a motor, to vary the strength of the magnetic end effector. The actuator can be operatively coupled to the variable strength magnet end effector, wherein the actuator is selectively actuatable to control the adjustment of the variable strength magnet. The actuator also functions to maintain the variable strength magnet at a desired magnetic force output strength once achieved for any given amount of time.

In accordance with one example, the present disclosure is directed to a lift system for lifting one or more objects comprising a lifting element that can be supported about a platform. A master control unit can be provided for controlling the lifting element, as well as a variable strength magnetic end effector that is supported about the lifting element of the lifting system for facilitating the lifting of one or more objects. The variable strength magnetic end effector is in communication with the master control unit. The end effector can comprise a variable strength magnet that is continuously adjustable to an infinite number of output magnetic strengths or magnetic strength output levels. The lifting system may also comprise an actuator that is selectively actuatable to control the adjustment of the variable strength magnet, and to maintain the variable strength magnet at a desired magnetic force output strength to secure the object to the end effector. The strength or intensity of the magnetic force is selectively and continuously adjustable throughout a range between full strength and no strength. More particularly, the strength of the magnet may be infinitely adjustable within the given range.

In another example, the present disclosure is directed to a method for lifting and transporting a specific number of objects from a larger collection of objects using an end effector supported about a lift system and employing an adjustable magnetic force. In this example, the method comprises obtaining a collection of objects arranged adjacent one another and determining a specific number of objects to lift from the collection of objects. Once determined, a continuously variable strength magnetic end effector may be positioned about the collection of objects, wherein the variable strength magnetic end effector having an infinite number of available magnetic strength outputs. The variable strength magnetic end effector may be actuated to achieve a magnetic strength output above a threshold level suitable for discriminately lifting the specific number of objects from the collection of objects. Moreover, the magnetic strength output may be maintained at least at the threshold level for a given period of time.

In still another example, the present disclosure is directed to a magnetic end effector comprising a housing; a magnetic element disposed within the housing, the magnetic element being continuously adjustable to an infinite number of magnetic strength output levels; and at least one communication element that associates the magnetic element with an actuator that facilitates control of the adjustment of the magnetic element. The actuator may be configured to maintain the magnetic element at a desired magnetic force strength output level to secure a lifted object to the end effector.

With these general examples set forth above, it is noted in the present disclosure that when describing the magnetic end effector or related devices and methods, each of these descriptions are considered applicable to the other, whether or not they are explicitly discussed in the context of that example. For example, in discussing the magnetic end effector, per se, the device and/or method examples are also included in such discussions, and vice versa.

Furthermore, various modifications and combinations can be derived from the present disclosure and illustrations, and as such, the following figures should not be considered limiting in any way.

Illustrated in FIG. 1 is a magnetic end effector 100 configured as part of a user controllable teleoperated robotic lift system 110, the lift system comprising one or more structural elements for facilitating the lifting of objects. As shown, there is a master control unit 115 and a magnetic end effector 100. The master control unit 115 is in communication with the magnetic end effector 100 which enables a user at the master control unit 115 to control and adjust the magnetic end effector 100 to achieve an infinite number of magnetic force strengths or outputs between full power or intensity and no power or no intensity. As described in more detail herein, the magnetic strength of the magnetic end effector 100 can be continuously adjusted or varied within a pre-defined range according to the desires of a user.

In many aspects, enabling a user to vary and/or adjust the magnetic force of the magnetic end effector 100 to achieve an infinite number of strength outputs between full power and no power has many advantages over conventional lifting and transport systems. Indeed, many conventional magnetic lift systems employ the use of two magnetic strengths: "on" (full power) and "off" (no power). Accordingly, these conventional systems may be unable to selectively discriminate between objects when performing lifting and transporting functions.

In many instances, a user may need to lift a certain quantity of objects or a certain weight amount from a collection of objects. Shown in FIG. 1 is an operational example of the adjustable magnetic end effector 100. In the illustrated example, a lifting system 110 is lifting (illustrated by the upward arrow 120) a specific quantity of objects, in this case a single metal plate member 125, from a larger collection of plate members 130. Using the adjustable magnetic end effector 100, a user can lift and transport a specific quantity of objects by adjusting the strength of the magnetic force of the magnetic end effector 100 to correspond with a desired load. For example, a user that desires to lift more than a single metal plate member from the collection of plate members 130 can continuously vary the strength of the magnetic force to increase the magnetic force until the desired strength output (magnetic force) is achieved that is suitable to accomplish the task. In one aspect, this can be accomplished by monitoring how many plate members are lifted from the collection of plate members at a given magnetic force. If too many plate members are lifted, the magnetic force can be continuously varied to reduce the magnetic force. Upon reaching the magnetic force that separates the desired quantity of metal plate members from the collection of plate members 130, the user can then increase the strength of the magnetic force even further, such as to full strength, in order to better secure the metal plate member 125 to the magnetic end effector 100.

Also shown in FIG. 1, the user controllable teleoperated robotic lift system 110 can include a platform 135, and one or more lifting elements, such as the robotic arm 140 shown. It is contemplated that the platform 135 can be mobile, as shown in FIG. 1, or fixed at a permanent location. In one aspect, the platform 135 can provide support for a user controllable teleoperated robotic lift system 110. In another aspect, the platform 135 can provide combined support for the master control unit 115 and for a teleoperator, or user, of the system 110. Thus, a mobile platform 135 can allow the system 110 and the magnetic end effector 100 to be moved from place to place as desired. Additionally, the user can be positioned on the platform 135, such that the user can see, hear, and direct one or more of the magnetic end effectors 100 in the workspace in which the magnetic end effectors 100 operate.

It is contemplated that the master control unit 115 can include one or more visual and/or audio monitoring units that can enable the user to monitor the magnetic end effector 100 and the environment and objects around the magnetic end effector 100. The visual and/or audio monitoring units may be in communication with one or more monitoring devices, such as a camera or microphone.

It is additionally contemplated that the master control unit 115 can be remotely located relative to magnetic end effector 100. In this example, the magnetic end effector 100 can include a camera, microphone, or other instrument to convey visual and/or audio information to the remote user. With images and/or sounds reproduced from the magnetic end effector workspace, the user can adjust the magnetic end effector 100 as desired. It is further contemplated that whether in close proximity or remotely located relative to one another, the master control unit 115 and the magnetic end effector 100 can be linked by signals communicated via wired or wireless data transfer systems. Wireless transmissions can be via radio, satellite, cell phone network, or any other type of wireless communication.

In one example, shown in FIG. 1, the teleoperated robotic lift system 110 includes one or more robotic slave arms 140 in communication with the master control unit 115. As described in more detail herein, the position and orientation of the robotic slave arms 140 can be adjusted and controlled from the master control unit. Also shown, the magnetic end effector 100 can be coupled to the robotic slave arm 140. Accordingly, in one aspect, a user may manipulate and change the position of the magnetic end effector 100 by adjusting the position and orientation of the robotic slave arms 140.

It is contemplated that the magnetic end effector 100 may be coupled to a variety of types of user controlled lift devices or elements, such as, but not limited to, robotic slave arms 140, tines of a forklift, a crane, hoists, jacks, platform lifts, and so forth. In accordance therewith, the adjustable magnetic end effector 100 can be adapted to suit the needs of a workplace.

Figure 2:
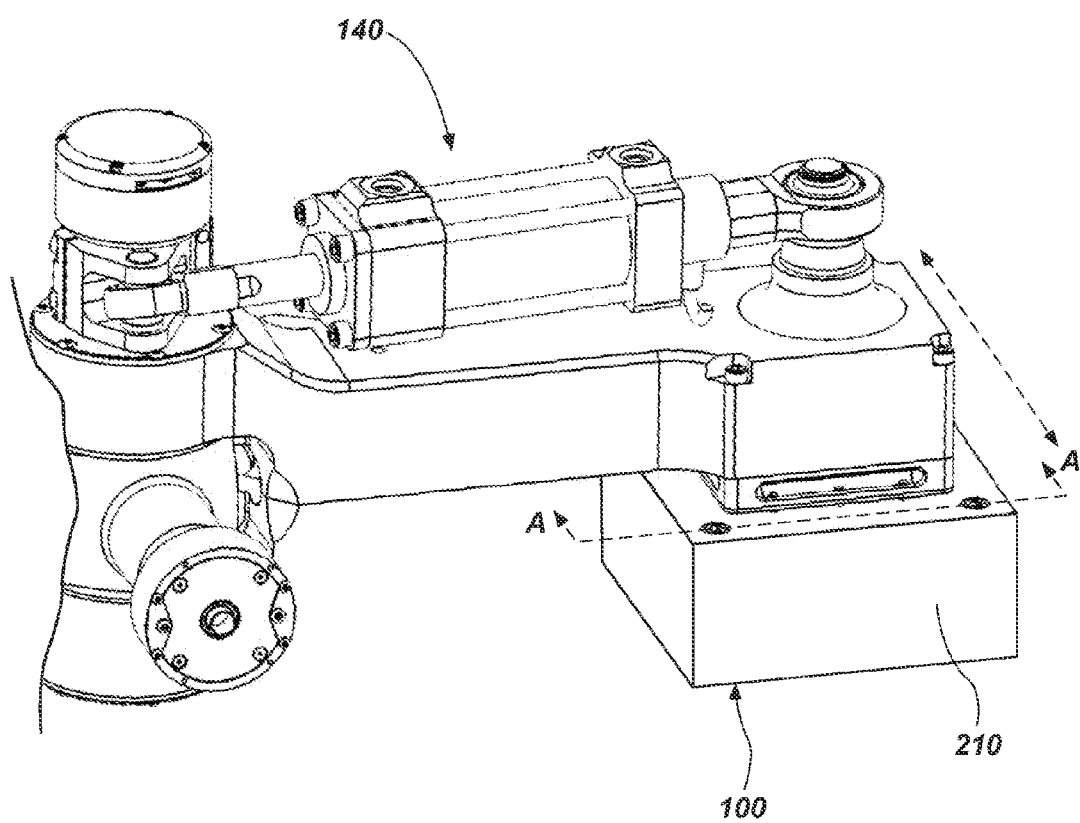
FIG. 2 illustrates a detailed perspective view of the magnetic end effector of FIG. 1.

Shown in FIG. 2 is a partial perspective view of a robotic slave arm 140 having a magnetic end effector 100 coupled to a support member 138 of the robotic slave arm 140. The magnetic end effector 100 can include a variable strength magnet 210. It is contemplated that the variable magnet 210 may be any suitable type, shape, size, grade, and/or strength. In some non-limiting examples, the magnet 210 may be a permanent magnet, such as that comprising, Neodymium Iron Boron, Samarium Cobalt (SmCo), Alnico, Ceramic, and/or Ferrite. However, these should not be limiting in any way. In one exemplary embodiment, the permanent magnet 210 may comprise a type of magnet made available from Industrial Magnetics, Inc. of Boyne City, Mo.

In an alternative example, the magnet 210 can comprise an electromagnet, having an electronic actuator that delivers current to the electromagnet. In one aspect, the electromagnet can comprise a metal core, such as an iron alloy. A wire coil can be wrapped around the metal core and a current from a power source can be directed to the wire coil. The power source may be any type, such as, but not limited to, a battery source or a power source contained in the master control unit 115 or platform 135 shown in FIG. 1.

Figure 3:
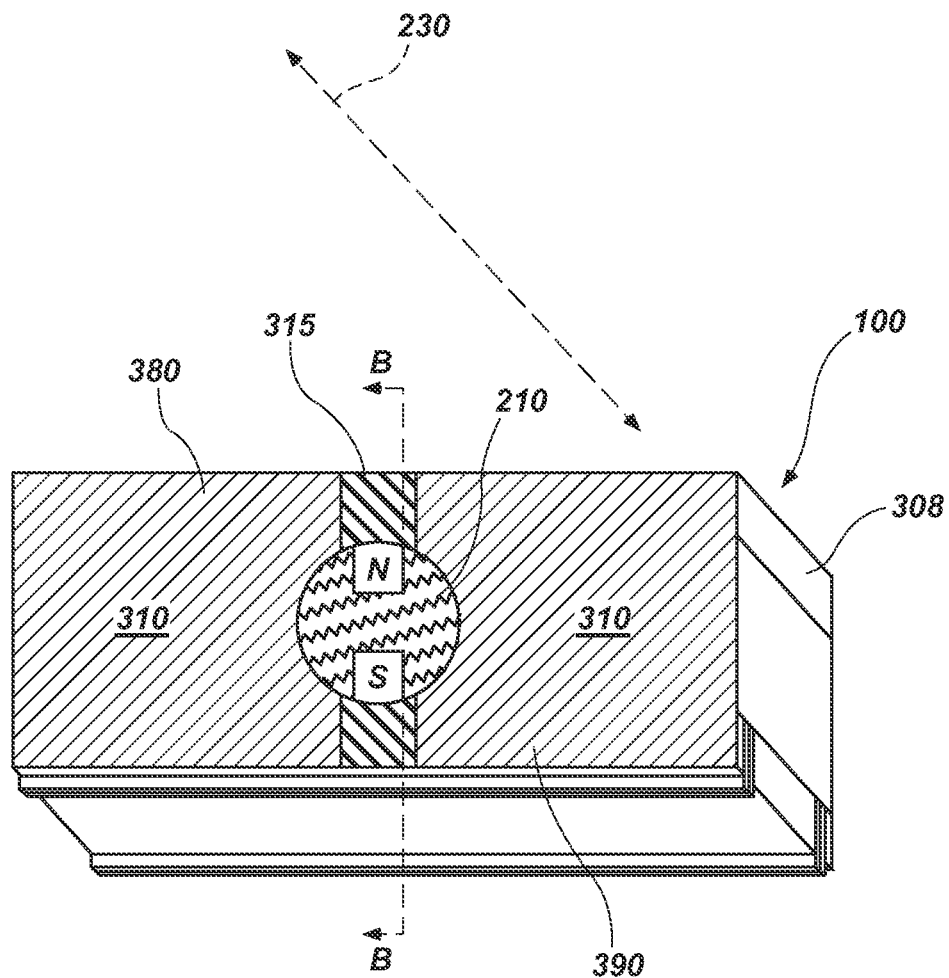
FIG. 3 illustrates a cross-sectional view of a portion of the magnetic end effector of FIG. 2, taken along lines A-A.

FIG. 3 is a cross-sectional view of the magnetic end effector 100 of FIG. 2, taken along lines A-A. The end effector 100 comprises the magnet 210, shown as a permanent magnet having north and south polar regions, as graphically illustrated by box N and box S. The magnet 210 is situated in a housing 308, and is shown in a configuration in accordance with one exemplary embodiment of the present disclosure. Within the housing 308 is disposed a first and second block of a ferrous material 310, such as iron. The first and second block 310 are separated by a non-ferrous material 315, such as brass or aluminum, also disposed within the housing 308. Extending along in a direction of a plane 230 in the interior of the housing and through the ferrous and non-ferrous materials 310 and 315, respectively, is a cavity sized and configured to receive the magnet 210. The strength of the magnetic force of the magnet 210 is variable depending upon the orientation or position of the magnet 210, and particularly the north and south polar regions. For example, the illustrated position of the magnet 210 in FIG. 3, and particularly the north and south polar regions, places the north and south polar regions in a vertical orientation in line with the non-ferrous material 315, which functions to turn the magnet off. In this "full off" position, no magnetic force is registered or produced through the magnet 210.

Conversely, orienting the magnet 210 so that the north and south polar regions are horizontal and in line and in contact with the ferrous material 310 causes the magnet 210 to produce a maximum magnetic force or strength output. Orienting the magnet 210 in this "full on" position can be accomplished, for example, by rotating the magnet 210 to be into contact with first and second blocks 380 and 390 of the ferrous material 310.

As indicated above, in one aspect, selectively controlling the rotation of the permanent magnet 210 can be used to selectively increase and decrease the strength or intensity of the magnetic force of the magnet 210. Specifically, causing the permanent magnet 210 to be positioned in one of an infinite number of positions between the "full on" and "full off" positions can enable a magnetic force of a lesser degree as compared to the permanent magnet's "full on" or full powered position. In these in between positions, the magnetic flux extends partially through the ferrous material 310 and the non-ferrous material 315 to produce a reduced magnetic force. Continuously varying the magnet 210 position between these positions effectively functions to vary the strength of the magnetic force.

Figure 4:
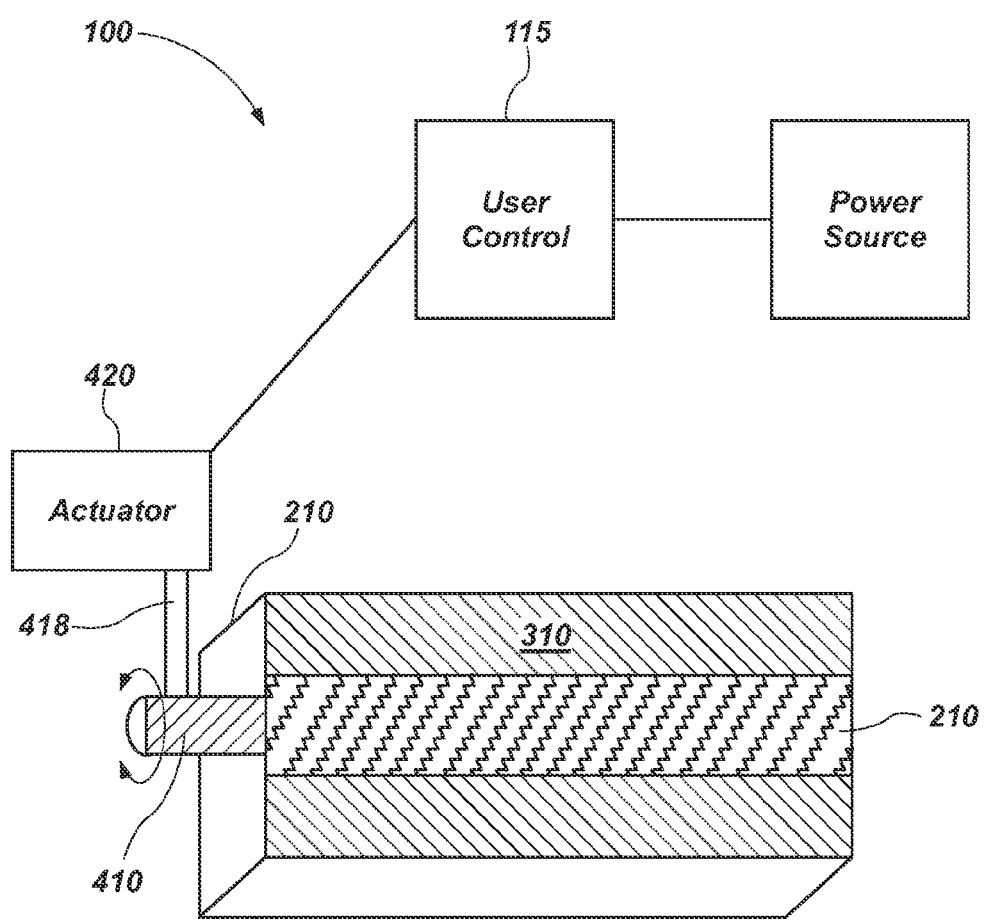
FIG. 4 illustrates a perspective diagram of a magnetic end effector configured in accordance with one example of the present disclosure, with the diagram comprising a cross-section of the portion of the magnetic end effector of FIG. 3 as taken along lines B-B.

FIG. 4 illustrates a cross-sectional view of the magnetic 210 of FIG. 3, as taken along lines A-A, in conjunction with an exemplary embodiment of an end effector incorporating the magnet 210. As represented graphically, the end effector comprises or is otherwise designed to operate with an actuator device 420 operably linked to the permanent magnet 210 through at least one communication 418 element that links or otherwise associates the magnet 210 with an actuator that facilitates control of the adjustment of the magnet. The actuator device 420 may be operably linked to the permanent magnet 210 via the communication element 418 in a variety of ways. In one non-limiting example, the actuator device 420 is operably linked to the permanent magnetic 210 via, and the communication element comprises, a shaft member 410 that extends outward from the magnet 210, and that is coupled or otherwise secured to the magnet 210, such that rotation of the shaft 410 rotates the magnet 210. The actuator 420 can be in communication with the master control unit 115, thus enabling a user to control the rotation of the shaft, and therefore the permanent magnet 210, by actuating the actuator 420. In some embodiments, the actuator may not actually be a part of the end effector, but rather supported about a different structure, such as the lifting element of a lift system.

In one aspect, shown in FIG. 4, the actuator 420 functions to enable the user to control the rotation of the permanent magnet 210. As previously discussed, the rotation of the permanent magnet 210 can function to adjust the strength of the magnetic force. Accordingly, through a user's control of the rotation imparted to the magnet 210 by the actuator 420, the magnetic force of the magnet 210 can be adjusted and controlled. Moreover, the actuator functions to be able to maintain the achieved magnetic force for any given period of time. It is contemplated that any suitable actuator type may be used, such as, but not being limited to, electrical actuators, hydraulic actuators, rotary actuator, pneumatic actuators, motors, etc.

Figure 5:
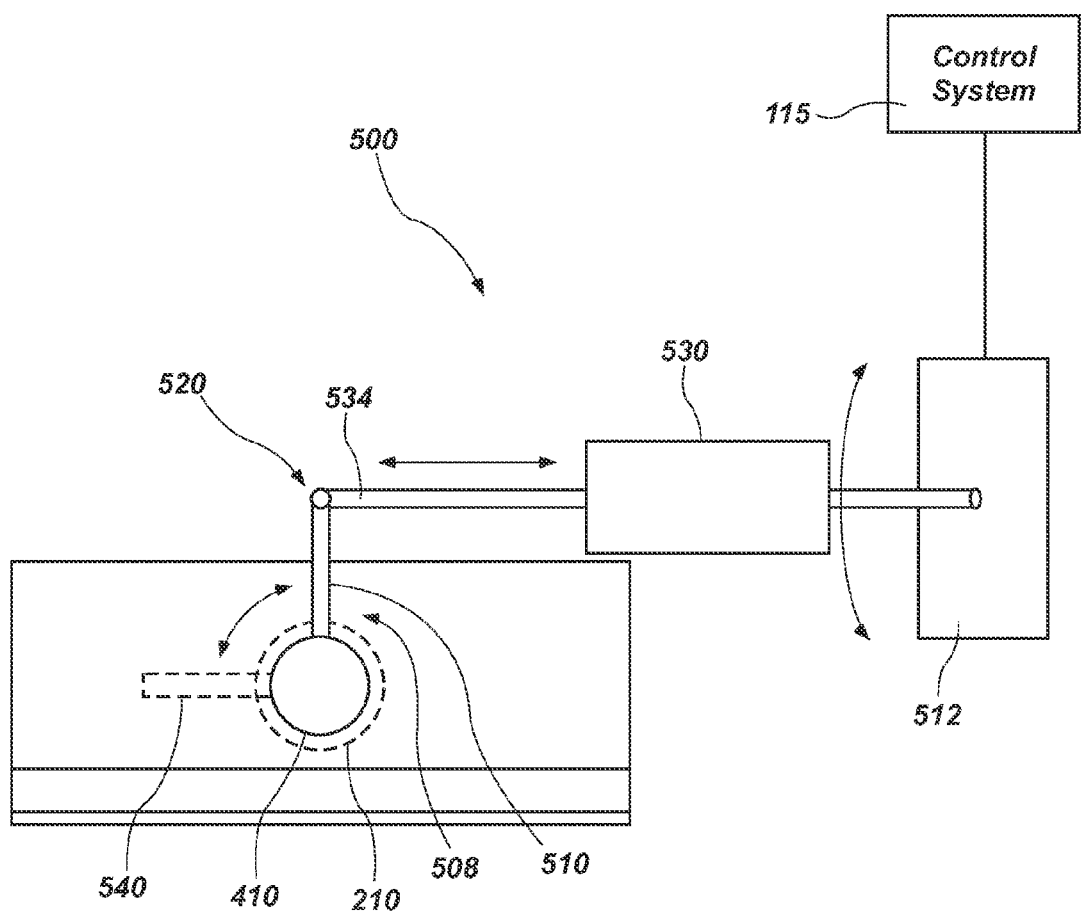
FIG. 5 illustrates an end view of a magnetic end effector formed in accordance with one example of the present disclosure.

FIG. 5 illustrates a conceptual diagram of an end effector 500 in accordance with one exemplary embodiment. As shown, the end effector comprises a shaft member 410 that is operably linked and secured to the permanent magnet 210. The shaft 410 is also operably connected to a communication element 508 comprising a linkage 510 having a hinge point, and a piston rod 534. The linkage 510 is operatively connected to the piston rod 534, which is part of a hydraulic, pneumatic or electric actuator. Rotation of the linkage 510 imparts a rotation to the shaft 410, and thus the magnet 210. In the embodiment shown, the actuator comprises a linear hydraulic actuator 530 that is pivotally mounted to or otherwise supported about the housing of the magnet 210, to the support member of the lift system, or any other suitable mounting member (represented by mounting member 512), and that is in communication with the master control unit 115, thereby enabling a user to control the operation of the actuator 530, and therefore the end effector, particularly the strength of the magnetic force of the magnet 210. Indeed, actuating the actuator 530 will cause the piston shaft 534 to linearly displace. As the piston shaft 534 is pivotally coupled to the linkage 510, linear motion in the actuator (the piston shaft 534) is converted into rotational motion within the shaft 410 and the magnet 210. Depending upon the desired output, the actuator 530 can be caused to selectively rotate the shaft member 410 and the magnet 210 to an infinite number of positions within a given range between the full "on" position (illustrated by the linkage 510 in a horizontal position at 540), and the full "off" position (illustrated by the linkage 510 in a vertical position at 520). Rotation of the shaft 410 and the magnet 210 in any position between these two "on" and "off" positions functions to reduce the strength of the magnetic forces produced by the magnet 210 and available in the end effector 100, thus facilitating variable strength output by the end effector 500.

In one aspect, the user can control the variable magnetic force with a user interface such as a trigger, lever, button, switch, or any other suitable user interface. The user interface can be coupled to the actuator to cause movement of the actuator in response to user input. For example, the user can pull on a spring-loaded trigger to achieve a desired amount of magnetic force. By varying the position of the trigger, the user can determine the appropriate amount of magnetic force by sight or feel. Thus, when picking up sheet metal pieces from a stack of sheet metal pieces, for example, the user can pull the trigger and move the magnetic end effector slightly to determine how many sheet metal pieces have been secured to the end effector. This process can be repeated with different trigger positions until the desired number of sheet metal pieces have been secured to the end effector. Once the user has removed the desired number of sheet metal pieces from the stack, the user can pull the trigger to a maximum position to achieve maximum magnetic force while moving the sheet metal pieces. The user can release the trigger to an appropriate extent to reduce the magnetic force in order to disengage the end effector from any number of the sheet metal pieces.

Figure 6:
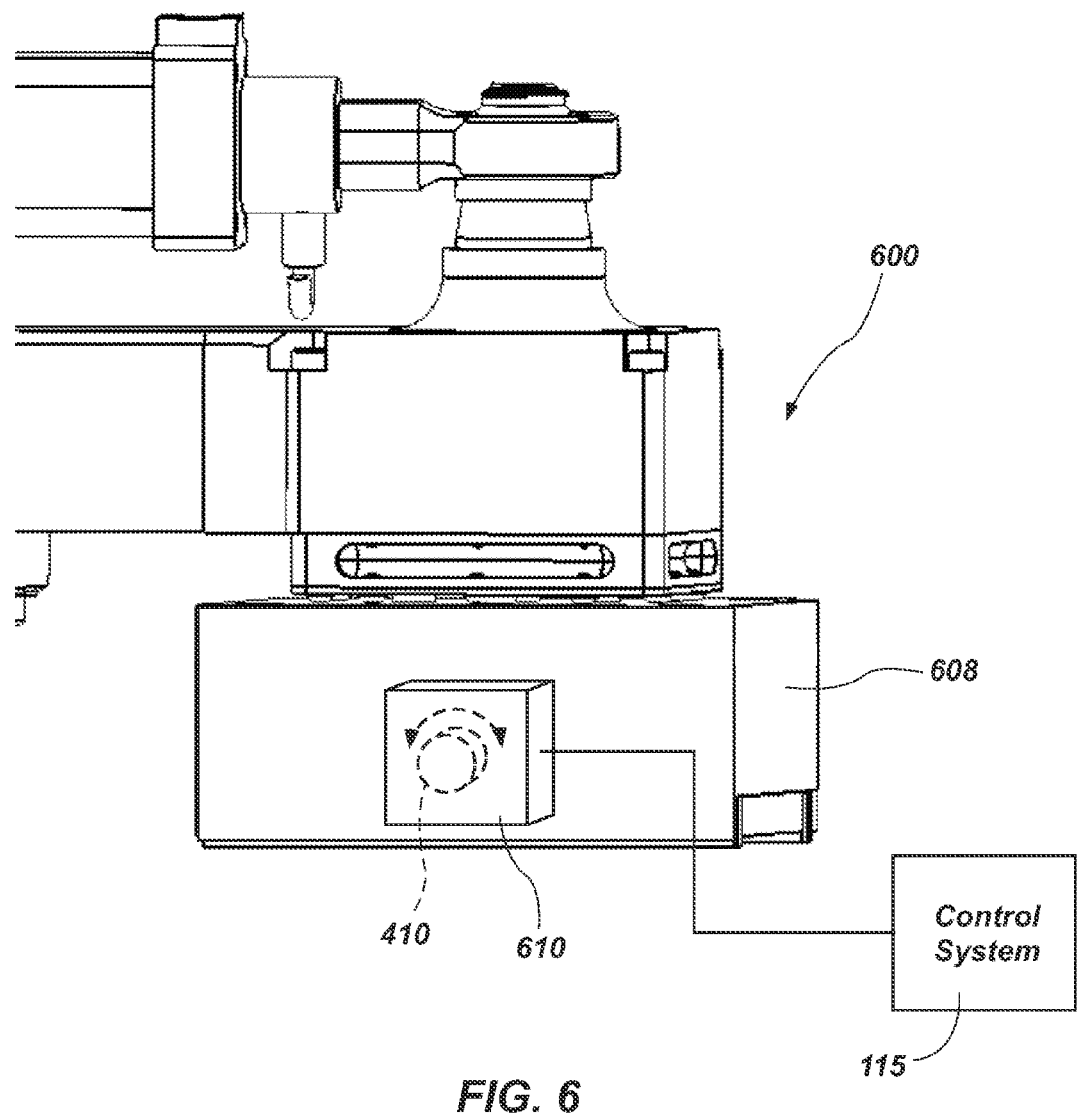
FIG. 6 illustrates a perspective view of a magnetic end effector formed in accordance with another example of the present disclosure.

Illustrated in FIG. 6 is a perspective view of an en effector 600 configured in accordance with another exemplary embodiment of the present invention. In this embodiment, the end effector 600 comprises a variable strength magnet (not shown) operatively controlled by an actuator in the form of an electric motor 610 configured to enable a user to adjust the strength of the magnet to provide an infinite number of output strengths in terms of its magnetic force, as described herein. The electric motor 610 is operatively linked or otherwise secured to the shaft member 410, which is operatively coupled or otherwise secured to the magnet (not shown) supported within the housing 608. The electric motor 610 is in communication with the master control unit 115 and a power source. In operation, the electric motor 610 may be configured to provide bi-directional rotation of the shaft 410 and the magnet in response to a user's command, thereby adjusting the output strength of the magnet in a similar manner as discussed elsewhere herein. As shown, the motor 610 is mounted to the housing 608 and located about the shaft 410. In another aspect, the motor may be mounted to a different mounting structure and operatively linked to the shaft 410 to provide similar rotation of the shaft 410 and the magnet.

Figure 6A:
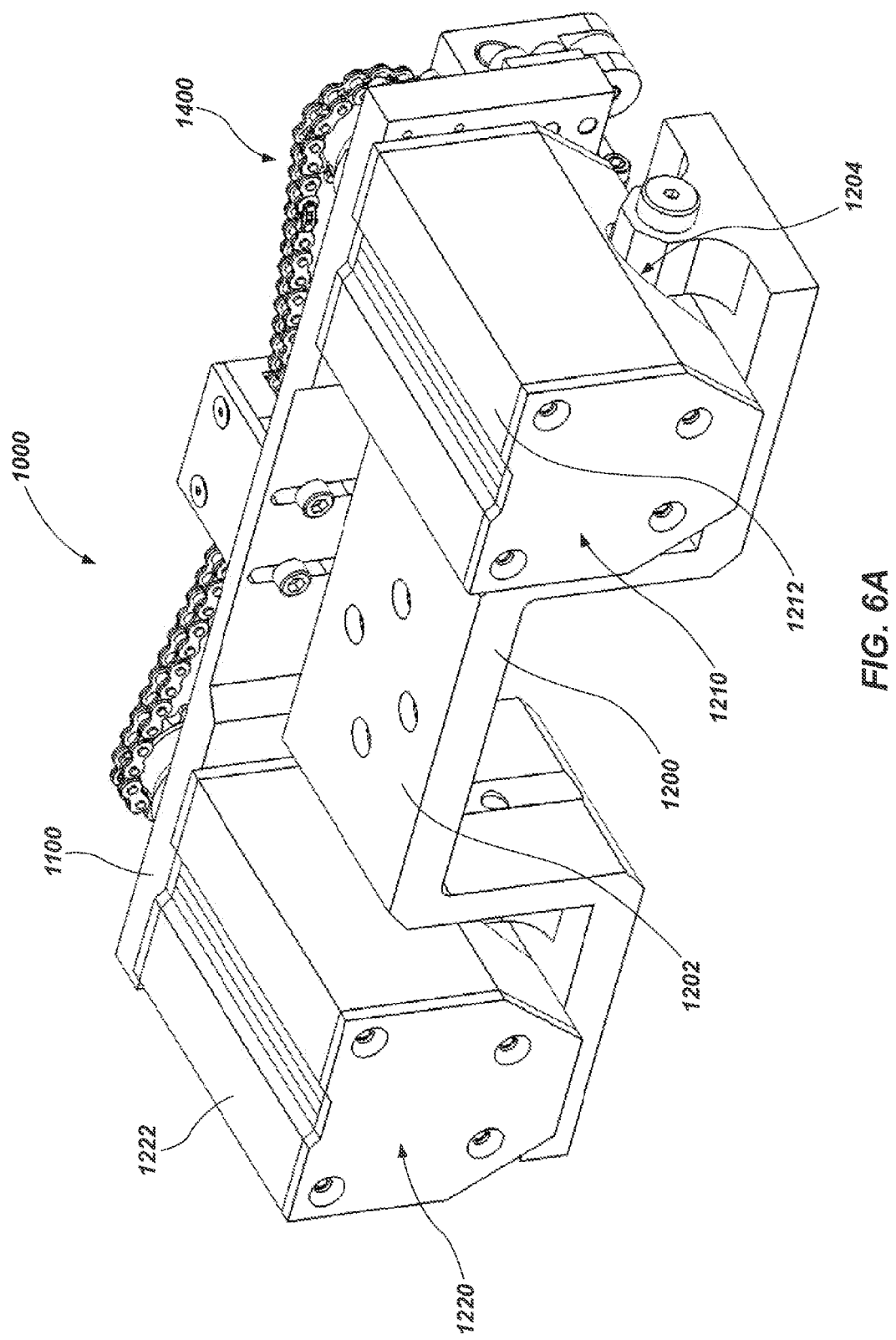
FIG. 6A illustrates a front perspective view of a magnetic end effector having more than one magnet, in accordance with an example of the present disclosure.
Figure 6B:
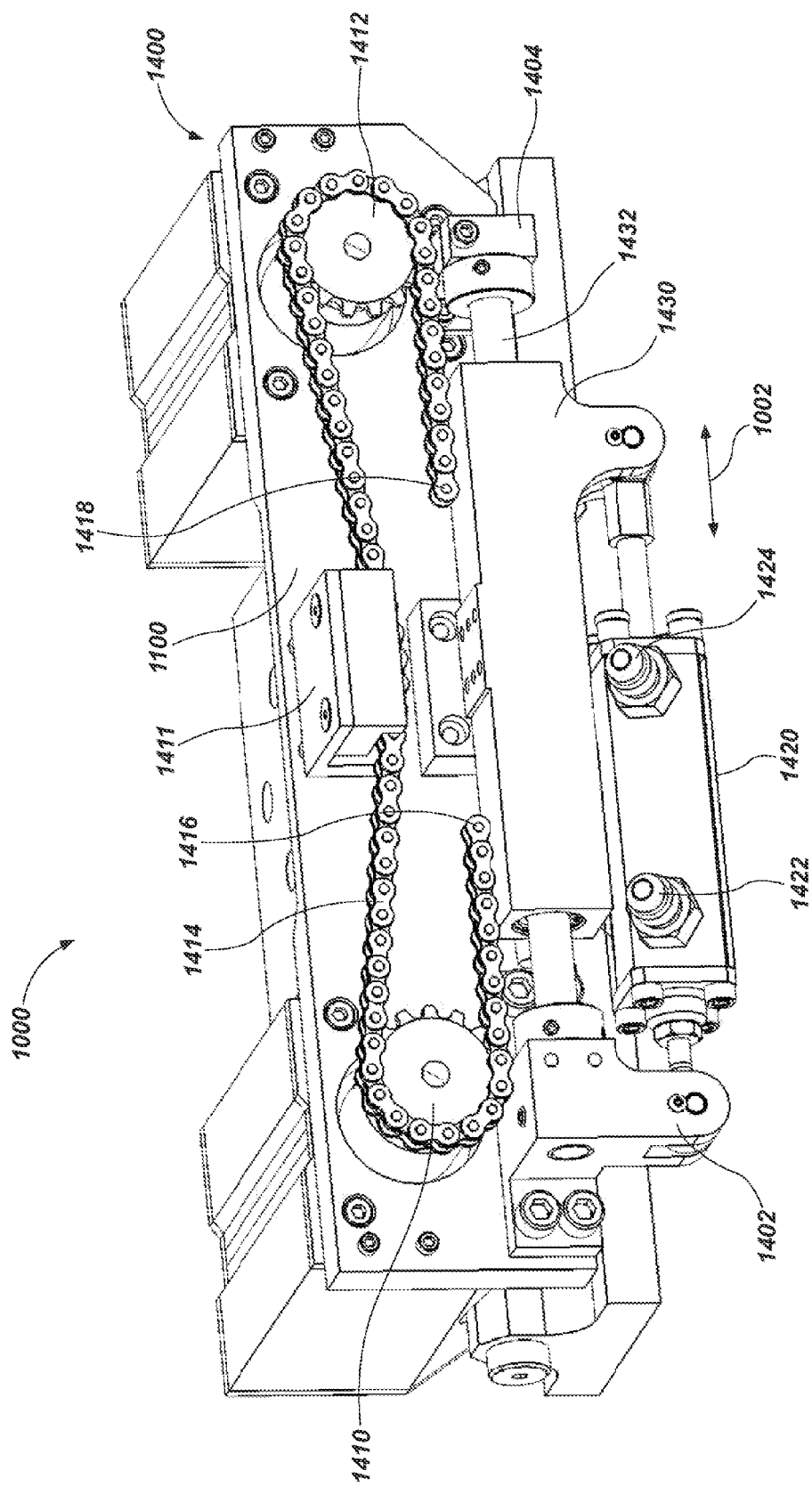
FIG. 6B illustrates a rear perspective view of the magnetic end effector in FIG. 6A.
Figure 6C:
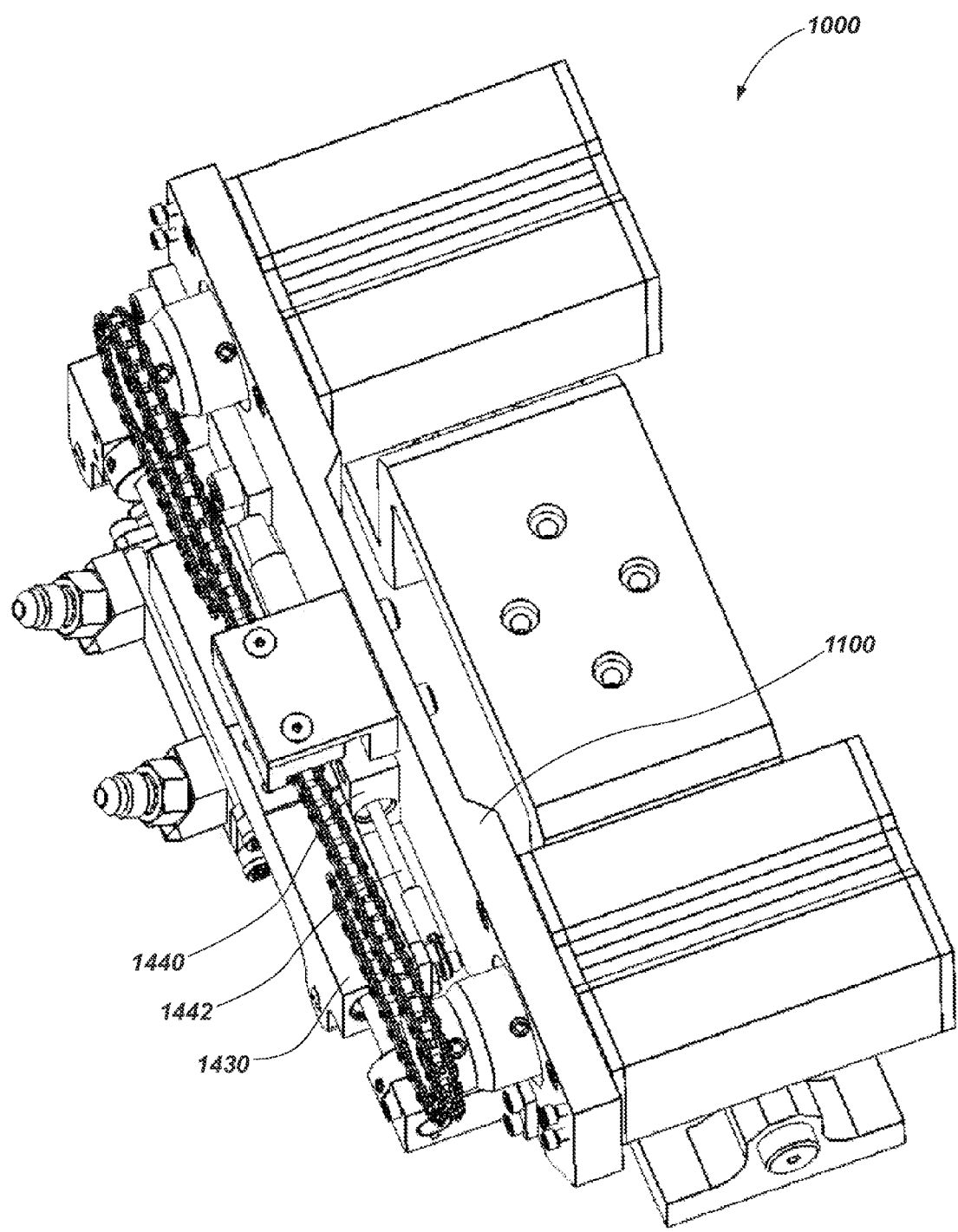
FIG. 6C illustrates a rear perspective view of the magnetic end effector in FIG. 6A.

Illustrated in FIGS. 6A-6C is another exemplary embodiment, wherein a magnetic end effector 1000 comprises more than one magnet or a plurality of magnets, such as magnets 1210, 1220. The magnets can be configured with interface regions 1212, 1222 for interfacing with a payload to be secured by the magnets. Mounting bracket 1200 can support the magnets 1210, 1220. In one aspect, the magnets 1210, 1220 can be pivotally coupled to the mounting bracket, as illustrated by pivot connection 1204. The pivot connections can be configured to allow small rotations up to about +/−20 degrees in order to provide some "give" in the end effector to move with a payload. This can allow the payload to maintain a secure coupling with the magnets even when undergoing a rotational displacement that would tend to twist or rock the payload loose from the magnets. The pivot connection can also include some form of resistance component to resist a freely pivoting and unrestrained movement at the connection. Such resistance can be linear or progressive in nature and can be applied by a spring, elastomer, or other suitable resistance component. The mounting bracket 1200 can also be configured to couple with a slave arm at mounting region 1202.

Magnetic strength can be adjusted by adjustment mechanism 1400. The adjustment mechanism 1400 can couple to and adjust the strength of each of the magnets 1210, 1220. For example, the magnets can be rotatable and coupled to a common drive mechanism. In one embodiment, the drive mechanism can comprise a gear or sprocket 1410, 1412 and a drive element, such as a chain 1414 or belt. The gear 1410, 1412 can be driven by the chain 1414. Opposite ends 1416, 1418 of the chain 1414 can be coupled to a carriage 1430, thus associating the carriage with the drive mechanism to facilitate operation of the drive mechanism and the adjustment mechanism. A tensioner 1411 can be used to put preload in the chain 1414 in order to prevent the chain 1414 from disengaging with the gears 1410, 1412. The carriage 1430 is configured to move linearly along a shaft 1432 in direction 1002. The shaft 1432 is coupled to support member 1100 at one end by bracket 1402 and at an opposite end by bracket 1404. Thus, movement of the carriage 1430 along the shaft 1432 causes the chain 1414 to move, which drives the gears 1410, 1412 and rotates the magnets 1210, 1220 to adjust magnetic strength. It should be recognized that any number of adjustable strength magnets can be coupled in this manner in order to simultaneously adjust the magnetic strength of all the magnets. In certain aspects, multiple groups of adjustable strength magnets can be employed, with each group of magnets being adjustable independent of the other group or groups. In another embodiment, the drive mechanism can include a rack and pinion gear system employed in place of the chain 1414 illustrated, with the rack replacing the chain and drive gears 1410, 1412 configured as pinions.

The carriage 1430 is caused to move by an actuator 1424. The actuator 1420 is coupled at one end to the support member 1100 by bracket 1402 and at an opposite end to the carriage 1430. Thus, the actuator 1420 displaces the carriage 1430 relative to the support member 1100. As shown, the actuator 1420 is a linear hydraulic actuator having hydraulic couplings 1422, 1424 that can be coupled to a control valve, such as a servo valve, to control movement of the actuator 1420.

A position sensor 1440 can be used to monitor the position of the carriage, which can be related to the magnetic strength due to the rotation of the magnets 1210, 1220. The position sensor 1440 can be coupled to the support member 1100 and can track the position of the carriage 1430 by a shaft 1442 coupled to the carriage 1430.

Figure 7:
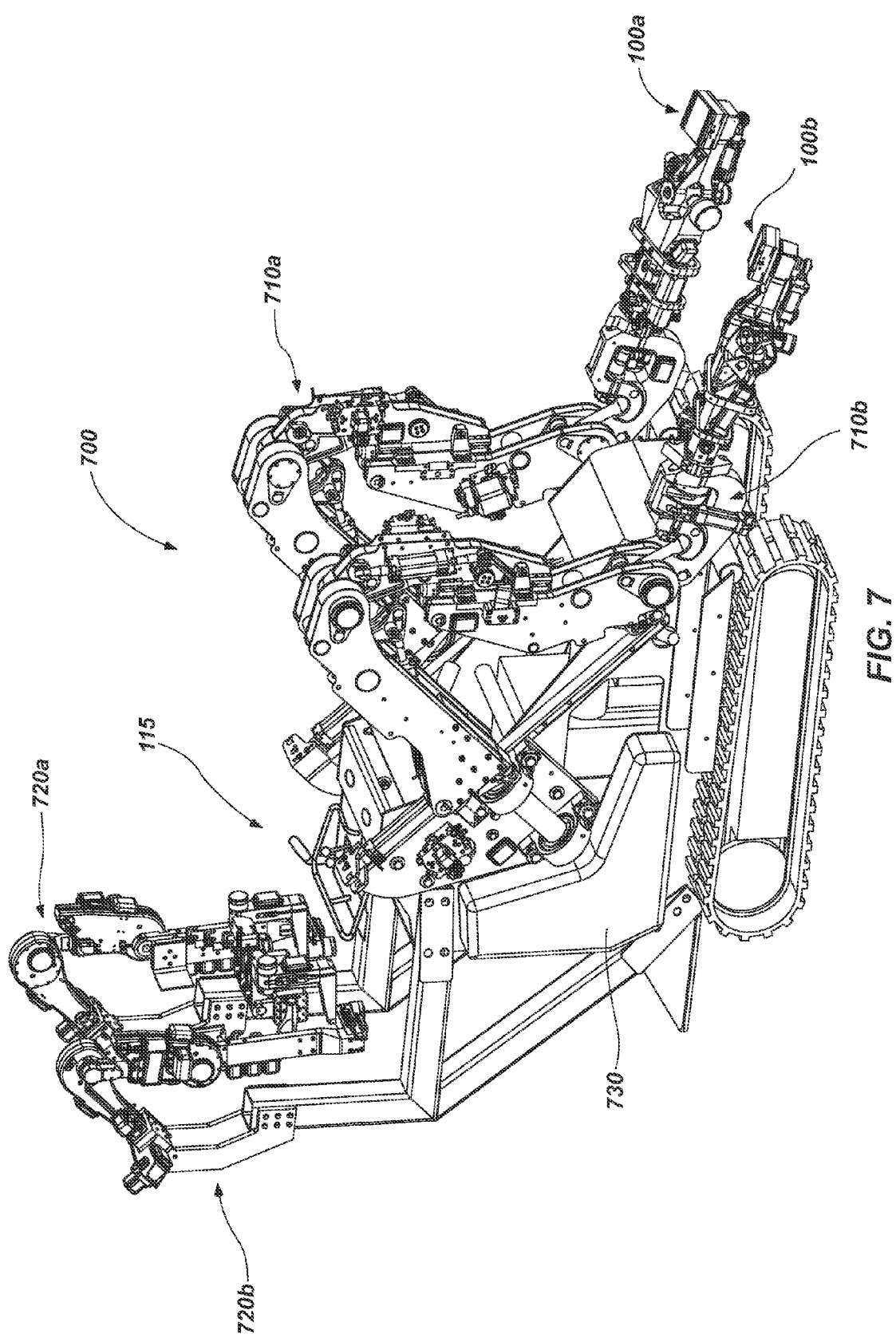
FIG. 7 illustrates a perspective view of a user controllable robotic lift system having a magnetic end effector formed in accordance with one example of the present disclosure.

Illustrated in FIG. 7 are adjustable magnetic end effectors 100a and 100b incorporated as part of teleoperated robotic lift system having master control arms 720a and 720b, which are operatively linked to and are used to control and manipulate the robotic slave arms 710a and 710b, respectively. In general, the master control arms 720a and 720b can include joints and linkages that correspond to the user's arm, such that movement of the user's arm causes the master control arms 720a and 720b to move in a manner similar to the user's movement. Similarly, the robotic slave arms 710a and 710b can include joints and linkages that correspond to the joints and linkages of the master control arms 720a and 720b, and thus, the user's arm as well. The master control arms 710a and 710b and the robotic slave arms 720a and 720b are each supported about a mobile platform unit 730. Additional details of a similar teleoperated robotic lift system are provided in copending application Ser. No. 13/332,165, filed on Dec. 20, 2011, and entitled, "Teleoperated Robotic Agile Lift System", and Ser. No. 13/332,152, filed on Dec. 20, 2011, and entitled, "Control Logic for Teleoperated Robotic Agile Lift System".

As shown, the adjustable magnetic end effectors 100a and 100b are coupled to or otherwise supported about robotic slave arms 710a and 710b, respectively. It is contemplated that the adjustable magnetic end effectors 100a and 100b can be coupled to the slave robotic arms 710a and 710b in a variety ways, such as but not limited to using bolts, rivets, welding materials, and so forth. In addition, it is contemplated that any necessary fluid, electric or other connections between the end effector and the robotic slave arm can also be provided.

In this embodiment, it is contemplated that the master control unit 115 and the controls for the adjustable magnetic end effectors 110a and 110b are incorporated into or otherwise operatively part of the master control arms 720a and 720b, respectively, thereby enabling a user to control and adjust the strength of the magnetic force of each of the end effectors 110a and 110b from the master control arms 720a and 720b, as well as to control the location, position, orientation and actuation of the adjustable magnetic end effectors 100 by manipulation of the slave arms 710a and 710b.

Figure 8:
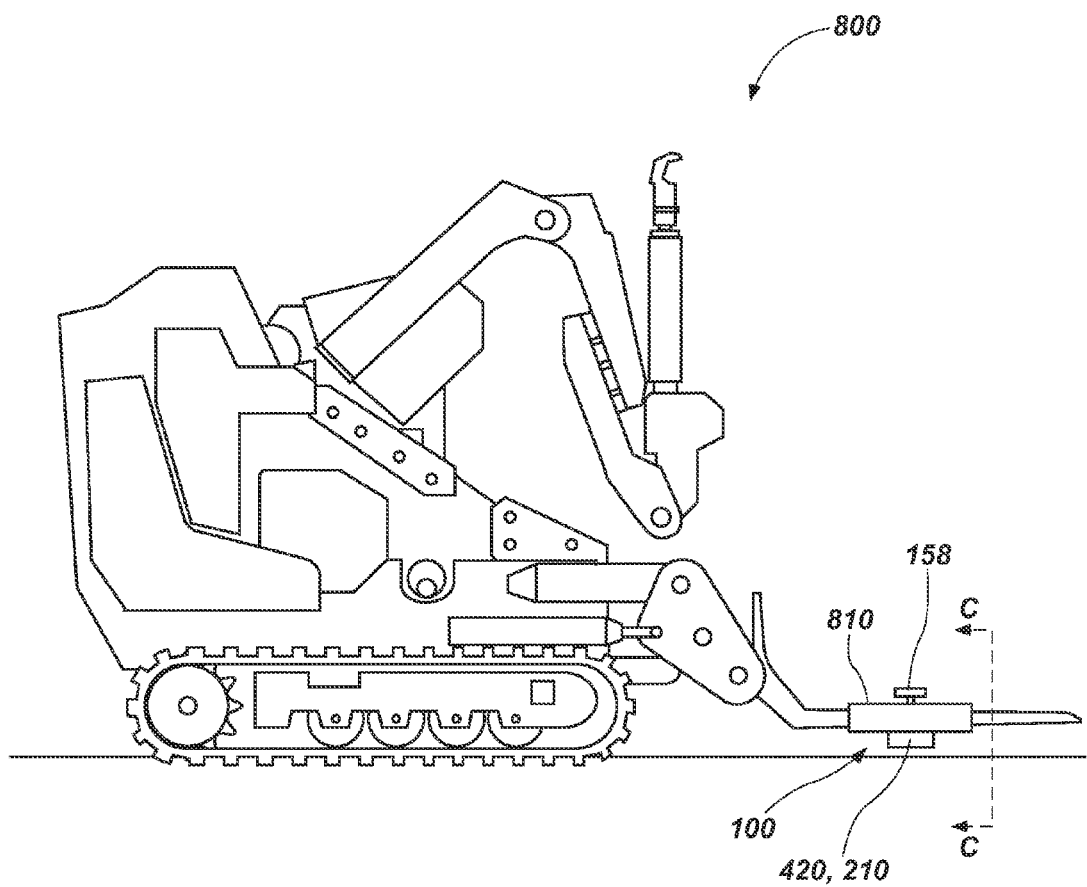
FIG. 8 illustrates a magnetic end effector as equipped on a user controllable lift system, such as a forklift, in accordance with one example of the present disclosure.
Figure 8A:
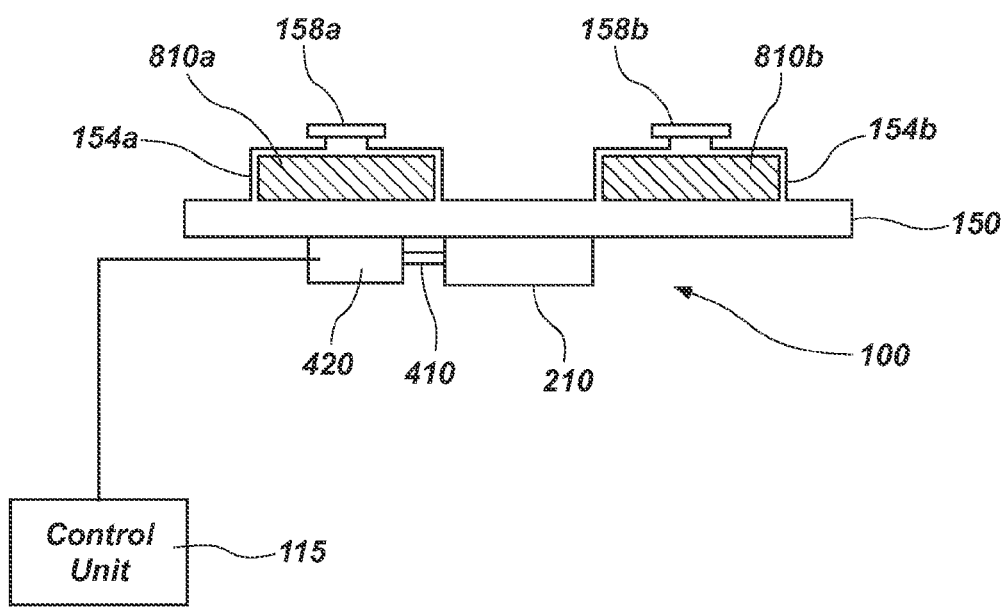
FIG. 8A illustrates a section view of the magnetic end effector of FIG. 8, taken along lines C-C.

Shown in FIGS. 8 and 8A, is another exemplary embodiment of a user operated lift system in the form of a forklift or forklift system 800, in which an adjustable magnetic end effector 100, as described herein, can be incorporated. As shown, an adjustable magnetic end effector 100 can be coupled or otherwise secured to the forks 810 of the forklift 800. The adjustable magnetic end effector 100 can be coupled to the forklift 800 at any suitable position and in any suitable manner. In the illustrated example, the adjustable magnetic end effector 100 is coupled to the underside of the forks 810. In one aspect, coupling the adjustable magnetic end effector 100 on the underside of the forks can enable a user to discriminately lift a selected quantity of objects from a larger collection of objects. Additionally, while the illustration shows a single adjustable magnetic effector 100 on the underside of the forks, it is contemplated that there may be several adjustable magnetic effectors 100 coupled to one or more of the forks 810.

In the example shown, the adjustable magnetic end effector 100 is coupled to a support plate 150. The support plate 150 can be coupled to the forks 810 via cages 154a and 154b that are each configured to slide over the respective forks 810a and 810b. The support plate 150 and cages 154a and 154b can be secured to the forks 810a and 810b using any known fastening or securing means. In the embodiment shown here, the support plate 150 and cages 154a and 154b are secured to the forks 810a and 810b using set screws 158a and 158b, respectively. The support plate 150 provides a coupling location for the variable strength magnetic end effector 100 on an underside of the support plate 150. Together, the cages 154, support plate 150, and the permanent magnet 210 can be configured to support a load to be suspended from the end effector 100. The support plate 150 also provides a mounting location for an actuator device 410 used to control and vary the magnetic force of the magnetic end effector 100. The actuator device 410 can be coupled to the adjustable magnet 210 via a shaft member 410 that can transfer torque from the actuator device 410 to adjust the strength of the magnetic force. The actuator 410 can be operatively coupled to and controllable by the master control unit 115.

In an alternative example, the forks 810 may comprise materials and components that enable the forks to function as an adjustable magnetic effector 100. For example, the forks 810 may comprise an electromagnet, having a metal alloy core and a coil wire wrapped around the alloy core with a current running therethrough. To operate and adjust the strength of the magnetic forks 810, a user can increase or decrease the current output dependent upon the user's desired magnetic strength.

While FIGS. 7 and 8 show an adjustable magnetic end effector used in a teleoperated robotic lift system and a forklift system, respectively, it is contemplated that the adjustable magnetic end effector 100 can be coupled to and/or used in conjunction with a variety of types user controllable lift and transport systems, such as but not limited to, cranes, hoists, jacks, platform lifts, and so forth.

Figure 9:
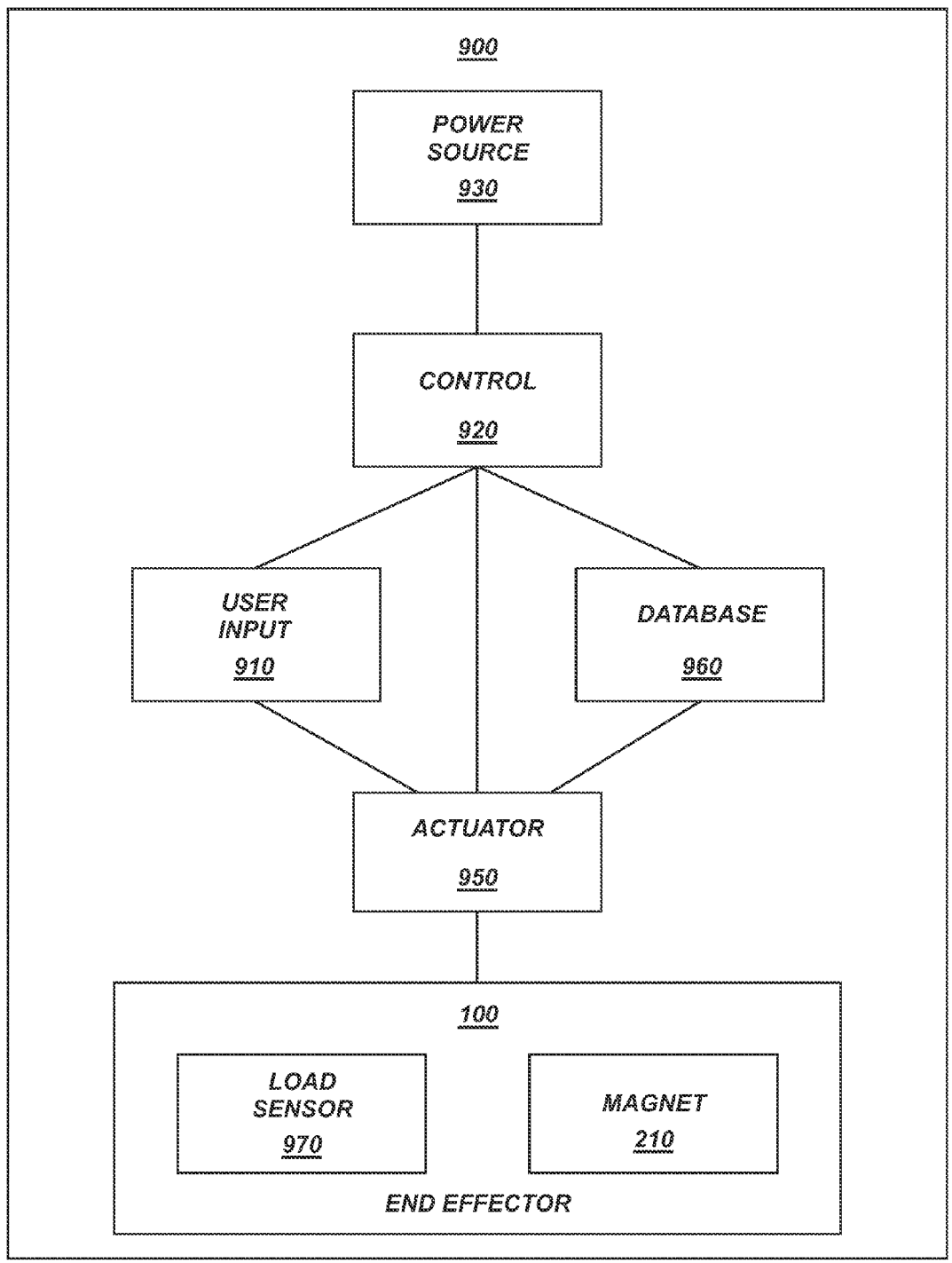
FIG. 9 is a block diagram of a user controllable lift system employing an adjustable magnetic end effector, in accordance with one example of the present disclosure.

Shown in FIG. 9, an adjustable magnetic end effector 100, as described herein, can be embodied in a system 900 whereby a user may specify a desired weight, weight range, or quantity of items to be lifted by the adjustable magnetic end effector 100. In at least one aspect, one function of the system 900 is to automatically adjust the magnetic strength of the magnetic end effector 100 to enable lifting of the desired weight, weight range, or quantity of items.

Shown in FIG. 9 is a system 900 for adjusting the magnetic strength of the magnetic end effector 100 in accordance with a user desired weight or quantity. The system 900 can include a user input device 910 or module 910 configured to enable a user to input a command, such as but not limited to, a desired weight, weight range, or quantity of items which the user desires to lift using the magnetic end effector 100. The user input unit 910 may include one or more controls such as a button, a dial, a keyboard, a touch screen, and so forth.

Also shown in FIG. 9, the user input unit 910 is in communication with a control unit 920 or control module 920. In at least one aspect, the control unit 920 is configured to communicatively link commands from the user input unit 910 to the actuator 950 and/or the database 960. It is contemplated that the control unit 920 can include hardware components such as circuits, transistors, switches, and so forth. It is additionally contemplated that the control unit 920 can include electronic and computer processor components such as operating systems, computer hardware, processors, software programs, and so forth.

Communicatively linked to the control unit 920 is a power source 930 or power module 930. In one aspect the power source 930 is configured to provide power to the system 900. The power source 930 can be any type of suitable power source, such as but not limited to batteries, any type of engine or hydraulic system, solar power, and so forth.

FIG. 9 illustrates an actuator unit 950 or actuator module 950 in communication with the control unit 920. It is contemplated that the actuator unit 950 can be any type of suitable actuator contemplated in the art or as described herein. As described in previous examples herein, the actuator 950 is operably linked to the magnet 210 and can function to adjust the magnetic strength of the magnetic end effector 100. Accordingly, a user can input a command, such as but not limited to, a desired load weight for the end effector 100. The actuator 950 can then function to adjust the magnetic strength of the end effector 100 to correspond with the desired load weight.

FIG. 9 illustrates a database 960 or database module 960 communicatively linked to the control unit 920. The database 960 is configured to store data associated with the functions and specifications of the system 900. The database 960 can include data and/or instructions associated with a range of load weight or quantity values that are selectable by a user. The database 960 can additionally include a range of actuator function values corresponding to the range of load weight or quantity values stored in the database 960. For example, an actuator function value can include data or instructions associated with operating the actuator to adjust the magnetic strength of the end effector 100, such as rotation of the permanent magnet, as illustrated in FIGS. 3 and 4.

By way of example only, a user selectable weight value of a hundred pounds may have a corresponding actuator value of a 20 degree rotation of the permanent magnet. In an alternative example, in a magnetic end effector 100 that includes an electromagnet, an actuator function value can include data and/or instructions associated with adjusting the magnetic strength of the magnetic end effector by adjusting the levels of current through the electromagnet.

It is contemplated that each selectable load weight or quantity value and the actuator function value corresponding to each load weight or quantity value can be predetermined and be included as part of the database 960. Accordingly, a user knowing a load weight of one or more potential objects to be lifted can input a command load weight value, the system 900 then calculates and/or matches the command load weight value with the corresponding actuator function value, after which the system 900 then instructs the actuator to adjust the magnetic strength of the end effector 100 accordingly. Once the object is secured to the end effector, the system can automatically increase the strength of the magnetic force to better secure the object about the end effector.

In an alternative example, the system 900 can function to determine the load weight of one or more objects. Shown in FIG. 9, the system 900 can additionally include a load or force sensor 970 incorporated or included as part of the end effector 100. It is contemplated that the load sensor may be any type of suitable load sensor such as a load cell, load transducer, weight sensor, and so forth. The load sensor 970 is in communication with the control unit 920, database 960 and/or the user input 910 and is configured to determine or measure the weight of an object being lifted by the magnetic end effector 100.

In one example, the load sensor 970 can additionally function to communicate the weight of a load to the various units or modules of the system 900. For example, the load weight can be communicated to the control unit 920 for processing, the database 960 for storage, and/or the user input unit 910 for output to a user.

In one example, to assist a user in determining, storing and recalling load weight values, such as load weights of previously lifted objects, the database 960 and/or the control unit 920 can include one or more load weight recall functions. The load weight recall functions can include instructions for storing, processing data from a user's previous loads and enabling a user to recall and have the system 900 automatically adjust the magnetic strength of the end effector 100 to be the same or substantially similar to previous load weights.

In an example, if a user needs to lift objects such as a stack of plates, the user can determine the weight of the first plate using the system 900. The load weight value of the first plate can be stored in the database 960 along with the actuator function value corresponding to the load weight value. Prior to lifting subsequent plates, a user can input a load weight recall function which instructs the control unit 920 to recall the data from the first lifted plate, data such as load weight and the corresponding actuator function. The control unit 920 then instructs the actuator to adjust the end effector adjustable magnet to the magnetic strength associated with the first plate. In at least one aspect, the load weight recall function is advantageous as in many situations a user does not know the load weight of one or more objects the user desires to lift.

In another example, the system 900 can enable a user to increase the magnetic strength of the end effector 100 to a desired degree above a desired or target load weight. By way of example only, if a desired load weight is one hundred pounds, the system 900 can be directed to automatically increase the magnetic strength to correspond to a load weight of one hundred ten pounds. Thus, the system 900 can enable a user to ensure the magnetic strength of the end effector 100 is sufficient to lift the desired load weight.

Some of the functional units described in this specification have been labeled as modules, in order to more particularly emphasize their implementation independence. The various modules, engines, tools, or modules discussed herein may be, for example, software, firmware, commands, data files, programs, code, instructions, or the like, and may also include suitable mechanisms. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The modules can also be a combination of hardware and software. In an example configuration, the hardware can be a processor and memory while the software can be instructions stored in the memory.

The methods and systems of certain examples described herein may be implemented in hardware, software, firmware, or combinations thereof. In one example, the method can be executed by software or firmware that is stored in a memory and that is executed by a suitable instruction execution system. If implemented in hardware, as in an alternative example, the method can be implemented with any suitable technology that is well known in the art.

Also within the scope of an example is the implementation of a program or code that can be stored in a non-transitory machine-readable medium to permit a computer to perform any of the methods described above. For example, implementation can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain program instruction and data for use by or in connection with the instruction execution system such as a processor. Computer readable media can comprise any one of many physical media such as, for example, electronic, magnetic, optical, electromagnetic, or semiconductor media. More specific examples of suitable computer-readable media include, but are not limited to, a magnetic computer diskette such as floppy diskettes or hard drives, a random access memory (RAM), a read-only memory (ROM), an erasable programmable read-only memory, or a portable device such as a compact disc (CD), thumb drive, or a digital video disc (DVD).

Various techniques, or certain aspects or portions thereof, may take the form of program code (i.e., instructions) embodied in tangible media, such as floppy diskettes, CD-ROMs, DVDs, hard drives, flash drives or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

While the foregoing examples are illustrative of the principles and concepts discussed herein, it will be apparent to those of ordinary skill in the art that numerous modifications in form, usage and details of implementation can be made without the exercise of inventive faculty, and without departing from those principles and concepts. Accordingly, it is not intended that the principles and concepts be limited, except as by the claims set forth below.

What is claimed is:

1. A lift system for lifting one or more objects, the lifting system comprising:
    a lifting element supported about a platform:
    a master control unit for controlling the lifting element:
    a variable strength magnetic end effector supported about the lifting element for facilitating the lifting of one or more objects, and in communication with the master control unit, the end effector comprising a variable strength magnet that is continuously adjustable to an infinite number of magnetic output strengths; and
    an actuator that is selectively actuatable, and that facilitates control of the adjustment of the variable strength magnet, wherein the actuator maintains the variable strength magnet at a desired magnetic force output strength to secure a lifted object to the end effector,
    wherein the actuator is operably linked to the magnet, whereupon actuation of the actuator functions to cause the magnet to rotate to one of an infinite number of positions within a pre-defined range, and between a maximum magnetic force output and a no magnetic force output.

2. The lift system of claim 1, wherein the magnet is selected from the group consisting of a permanent magnet and an electromagnet.

3. The lift system of claim 1, wherein the magnetic end effector comprises:
    a block of non-ferrous material sandwiched between a first and a second block of a ferrous material; and
    a cavity extending through the block of non-ferrous material and the first and second blocks of the ferrous material,
    wherein the cavity is sized to receive the magnet, and wherein the magnet extends at least partially through the cavity.

4. The lift system of claim 1, wherein the actuator is supported about a structure of the end effector.

5. The lift system of claim 1, wherein the lifting element comprises a robotic slave arm operatively linked to the master control unit, and wherein the magnetic end effector is coupled to the robotic slave arm.

6. The lift system of claim 5, wherein the master control unit comprises a master control arm that controls movement of the robotic slave arm and the end effector.

7. The lift system of claim 1, wherein the platform comprises a mobile platform, and wherein the master control arm and the slave arm are each supported about the mobile platform.

8. The lift system of claim 1, further comprising at least one force sensor operable with the variable strength magnetic end effector to measure and determine a load weight value of the object.

9. The lift system of claim 1, further comprising a plurality of variable strength magnets that are continuously adjustable to an infinite number of magnetic output strengths.

10. The lift system of claim 9, wherein the end effector comprises:
 a mounting bracket coupled to the slave arm that supports the plurality of variable strength magnets; and
 an adjustment mechanism that couples to and adjusts the strength of at least two of the plurality of magnets.

11. The lift system of claim 10, wherein the adjustment mechanism further comprises:
 a drive mechanism having a drive element;
 a shaft supported about the end effector, and
 a carriage associated with the drive mechanism and moveable by the actuator about the shaft to cause the drive mechanism to move and adjust the magnetic strength of the magnets.

* * * * *